United States Patent [19]
Karubian et al.

[11] Patent Number: 5,584,757
[45] Date of Patent: Dec. 17, 1996

[54] ANIMAL HEAD PROCESSING APPARATUS WITH HOG SNOUT PULLER

[75] Inventors: Ralph K. Karubian, Los Angeles, Calif.; Thomas G. Surman, Westpoint, Nebr.

[73] Assignee: Kentmaster Mfg. Co., Inc., Monrovia, Calif.

[21] Appl. No.: 675,622

[22] Filed: Jul. 3, 1996

[51] Int. Cl.⁶ .............................. A22B 5/20; A22C 17/00
[52] U.S. Cl. .................... 452/166; 452/152; 452/198
[58] Field of Search ..................................... 452/166, 198, 452/152, 160, 168, 135, 136

[56] References Cited

U.S. PATENT DOCUMENTS

| | | | |
|---|---|---|---|
| 4,262,386 | 4/1981 | Saget | 452/135 |
| 4,543,689 | 10/1985 | Couture | 452/135 |
| 4,653,145 | 3/1987 | Swilley | 452/160 |
| 4,918,788 | 4/1990 | Passchier | 452/135 |
| 5,512,013 | 4/1996 | Passchier | 452/136 |
| 5,533,928 | 7/1996 | Karubian et al. | 452/135 |

*Primary Examiner*—Willis Little
*Attorney, Agent, or Firm*—Allan M. Shapiro

[57] ABSTRACT

The hog's head, in the upside-down position, is moved jaw first across a table where a jaw removal bar engages under the lower jaw. The snout has been previously loosened by a slash on each side behind the snout. The loosened snout gravitates through a snout slot in the table. Below the snout slot, a snout puller clamp engages the snout. At the same time, the jaw removal bar swings the lower jaw up and back. The snout puller swings away beneath the table to pull off the snout and attached faceplate tissue. The snout is released, and the snout puller returns for the next cycle.

28 Claims, 4 Drawing Sheets

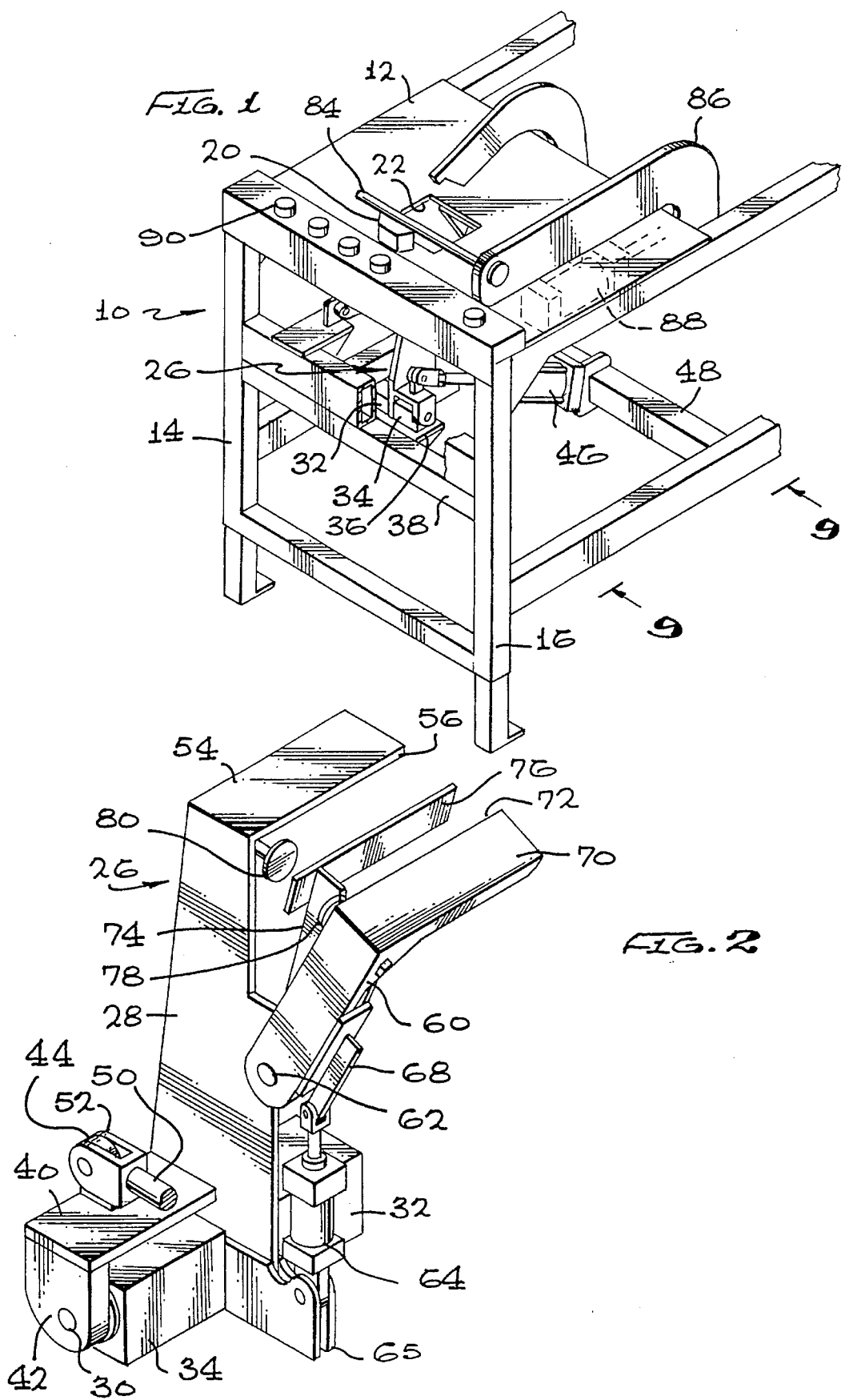

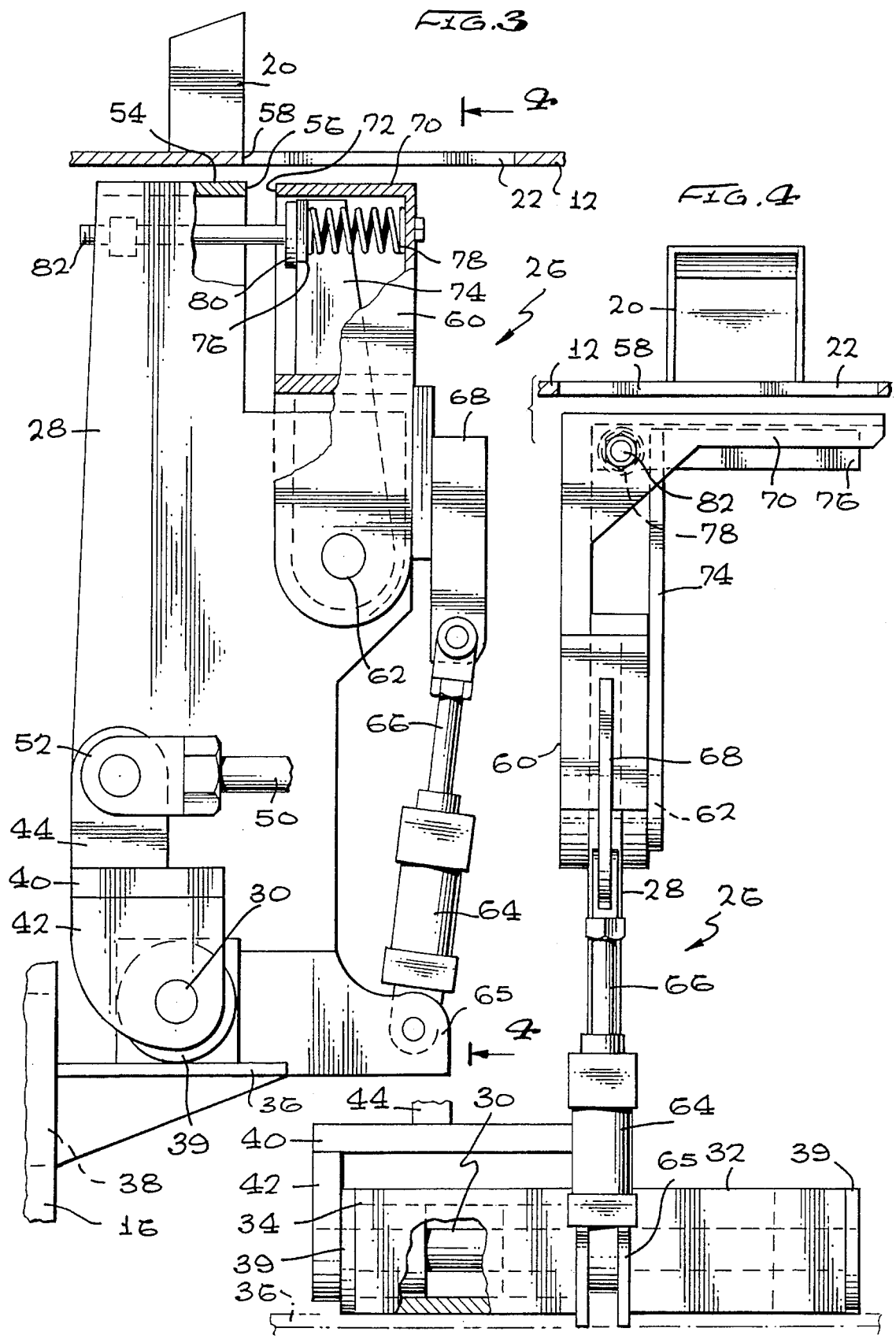

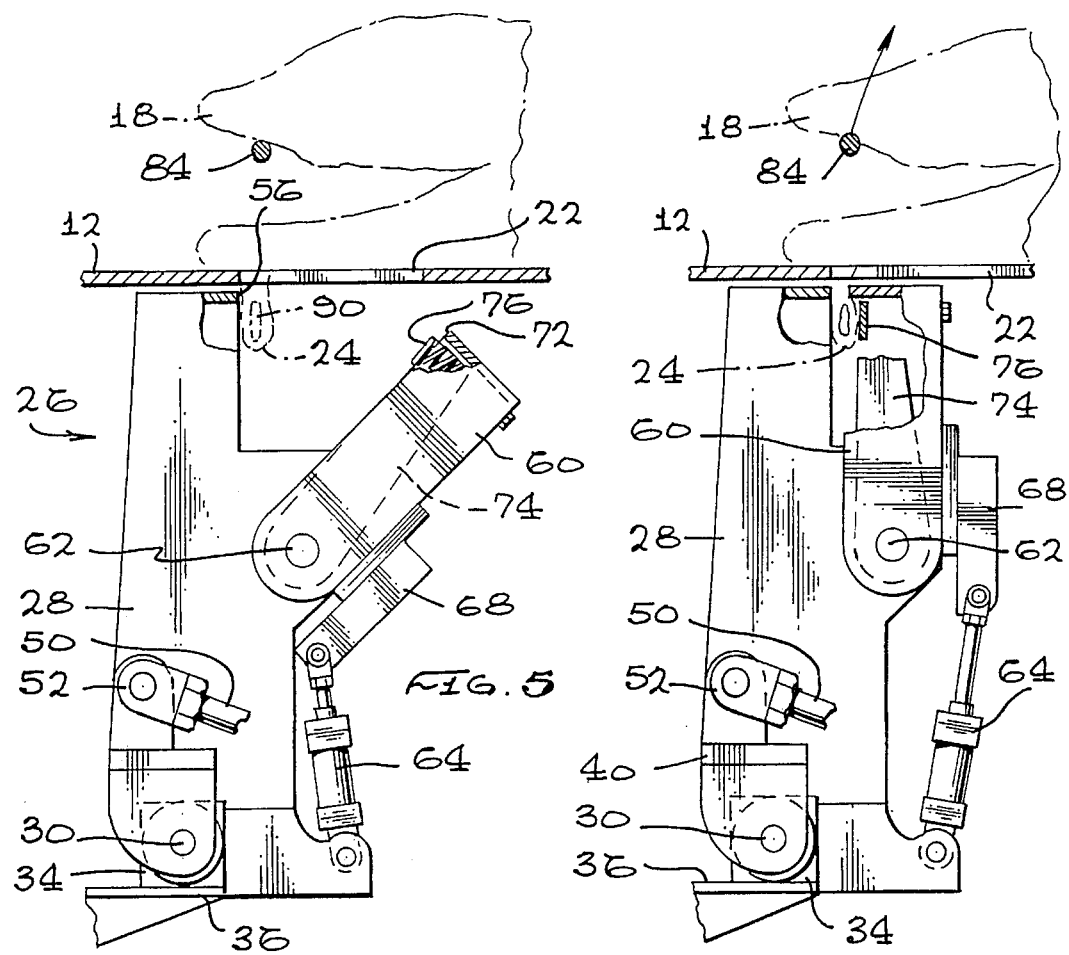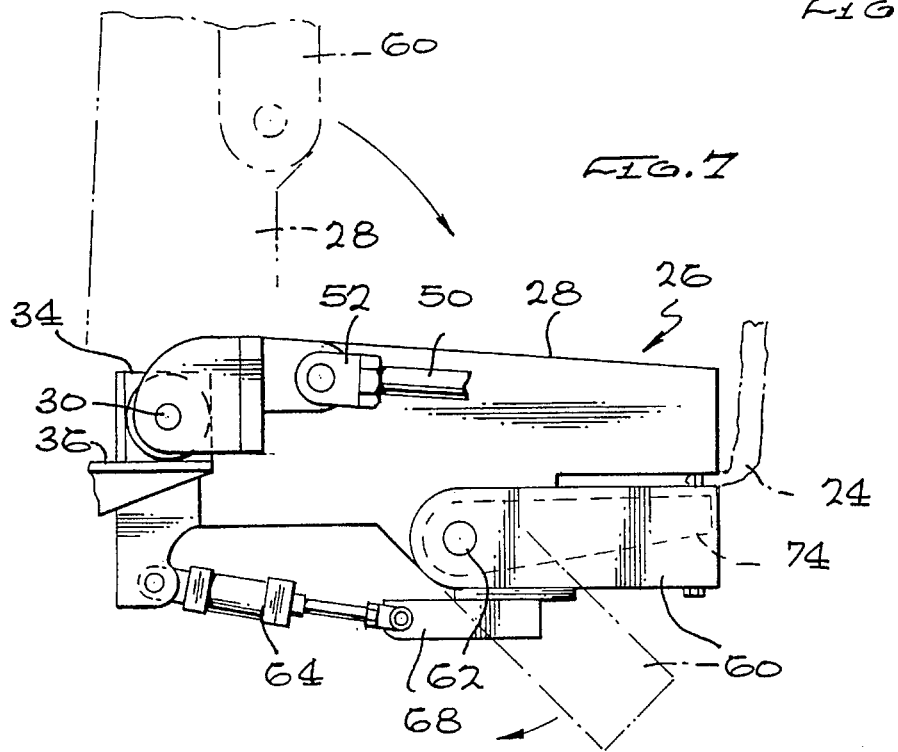

ANIMAL HEAD PROCESSING APPARATUS WITH HOG SNOUT PULLER

FIELD OF THE INVENTION

This invention is directed to an animal head processing apparatus with a hog snout puller which pulls away the hog snout and attached tissue.

CROSS REFERENCE

This invention is related to the invention disclosed in copending patent application, Ser. No. 395,418, filed Feb. 27, 1995, for "ANIMAL HEAD PROCESSING APPARATUS," the entire disclosure of which is incorporated herein by this reference.

BACKGROUND OF THE INVENTION

The butchering process for hogs requires many individual steps to separate the parts into categories for different utilization. As the hog's head moves through the process, the lower jaw is separated and the snout is removed. The snout has been removed by thrusting the snout to engage a rotating wheel which has extending therefrom snout-engaging pins. It is the purpose of these pins to engage in the snout openings and to tear the snout away from the upper jaw structure.

One problem with this type of snout removal is safety of the workers. This wheel with its snout-engaging pins must be exposed so that the worker can thrust the snout thereagainst. Thus, it cannot be completely covered to provide worker safety. The second problem is one of effectiveness. On some hogs' heads, the pins tear the snout but do not engage it enough to pull it away. Thus, secondary processing is required for this step.

There is need for both improved safety for the worker and improved snout removal effectiveness at this stage in the hog's head butchering process.

SUMMARY OF THE INVENTION

In order to aid in the understanding of this invention, it can be stated in essentially summary form that it is directed to a hog's head processing apparatus with a hog snout puller so that the hog snout can be effectively and safely removed from the hog's head.

It is thus a purpose and advantage of this invention to provide a hog's head processing apparatus which enhances the safety of the worker by placing the hog snout puller in a position where it is less likely to be engaged by the operator.

It is a further purpose and advantage of this invention to provide a hog's head processing apparatus which is more effective in the production line because it is more effective in proper removal of the hog snout together with associated tissue.

It is a further purpose and advantage of this invention to provide a hog's head processing apparatus which saves operational time to conserve workman time, machine time and speed the hog's head through the processing apparatus by removal of the snout and separation of the lower jaw during the same process step.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is an isometric view of the animal head processing apparatus with hog snout puller in accordance with this invention with parts broken away.

FIG. 2 is a perspective view of the hog snout puller structure.

FIG. 3 is a side-elevational view of the apparatus, particularly showing the hog snout puller, with parts broken away and parts taken in section, on a larger scale than FIG. 2.

FIG. 4 is a view of the hog snout puller, as seen generally along line 4—4 of FIG. 3.

FIG. 5 is a side view similar to FIG. 3, but on a smaller scale showing the apparatus in the initial, open position.

FIG. 6 is a view similar to FIG. 5 showing the apparatus in a snout-clamping position.

FIG. 7 is a view similar to FIG. 6 showing the hog snout puller in the snout-pulled position.

DESCRIPTION OF THE PREFERRED EMBODIMENT

Figure 9:
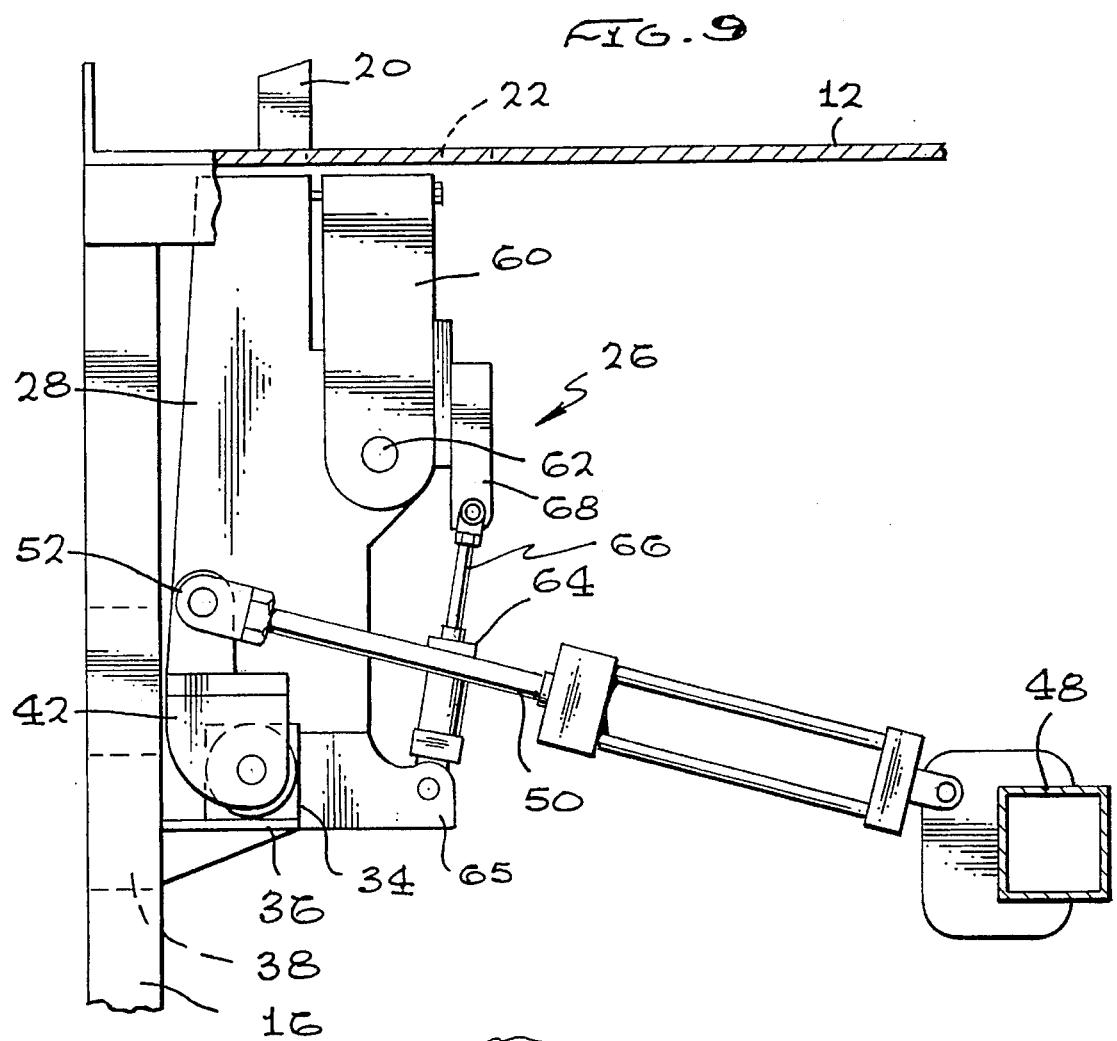
FIG. 9 is a side elevational view of the table with the apparatus of this invention secured thereto.

The animal head processing apparatus with hog snout puller of this invention is generally indicated at 10 in FIG. 1. The apparatus includes a table top 12 which is mounted on suitable supports such as table legs 14 and 16. The table legs and table top are preferably part of the structure of a larger apparatus for processing of an animal head such as the apparatus shown in the application referred to in the above CROSS REFERENCE.

The apparatus 10 is specially configured for the processing of hogs' heads. The hogs' heads are successively presented to the apparatus. The hog's head 18 is generally indicated in dashed lines in FIGS. 5 and 6. The hog's head 18 is shown in the inverted position, with the lower jaw upward. Prior to coming to the processing station illustrated in FIG. 1, the head is diagonally slashed upward (in the conventional direction) behind the snout so that the snout is loosened from the front of the upper jaw. The snout remains attached to the faceplate tissue. The hog head 18 is advanced in the inverted position to the left, as shown in FIGS. 5 and 6, so that the upper jaw enters jaw cup 20 secured to the table top just in front of snout slot 22. As the hog head is advanced across the table top, the snout 24 falls through the snout slot 22 to the position shown in FIG. 5.

Snout puller 26 is positioned below table top 12 to grasp the snout and pull away the snout together with faceplate tissue. Snout puller 26 comprises a swing arm 28, which is mounted on shaft 30. Shaft 30 passes through two bearings 32 and 34, which are mounted on bifurcated shelf 36 attached to frame member 38, see FIGS. 5 and 6. The bearings 32 and 34 are roller bearings with their inner races attached to shaft 32 and their outer races within the bearing housings attached to the bifurcated shelf. The ends of the bearings are sealed by nylon seal washers such as the one indicated at 39 in FIG. 4.

Clevis mounting arm 40 is directly attached to swing arm 28, as by welding. The outer end of the clevis mounting arm 40 is secured by attachment to the swing arm shaft 30 by bracket 42, see FIG. 2. Clevis pivot bracket 44 is mounted on arm 40. Fluid cylinder 46 has its head end mounted to cross member 48, which is part of the table frame, see FIGS. 1 and 9. Its piston rod 50 carries a clevis 52 thereon which is pivotally mounted on clevis bracket 44. The clevis may be adjustable on the piston rod, or the cylinder may be adjustable with respect to the table frame so as to define end stop limits. When the cylinder 46 is actuated to extend its piston rod 50, the swing arm 28 moves to the initial position shown in FIGS. 2, 3, 4, 5, 6 and 9. Swing arm 28 carries clamp bar 54 on its top, preferably with the clamp bar extending all to one side of the swing arm on the side away from clevis mounting arm 40 and cylinder 46. In the raised position with the piston rod 50 fully extended, the clamp edge 56 of the clamp bar is even with the front edge 58 of snout slot 22, as seen in FIGS. 3, 5 and 6. When the piston rod 50 is retracted into cylinder 46, the swing arm 28 is moved from the substantially vertical position of FIG. 3 to substantially the horizontal or slightly below horizontal position shown in FIG. 7.

Swing arm 28 with its clamp bar 54 and clamp edge 56 represents the first portion of the snout puller clamp. Clamp arm 60 is pivoted on swing arm 28 on pivot pin 62. Fluid cylinder 64 has its head end pivoted on a mounting projection 65 of swing arm 28, see FIG. 3. Fluid cylinder 64 has its piston rod 66 pivotally attached to bracket 68, which is secured to clamp arm 60. Fluid pressure in cylinder 64, which causes piston rod 66 to extend, moves the clamp arm 60 toward the clamping position. Clamp arm 60 carries clamp bar 70, which has a clamping edge 72. When the piston rod 66 is extended to move the clamping edge 72 toward the clamping edge 56, the clamp arm 60 stops when there is about one-quarter inch between the clamping edges 56 and 72. The stop is accomplished by the piston stopping in the cylinder at the fully extended position of piston rod 66. Adjustment is accomplished by piston clevis adjustment on bracket 68. The clamped position is shown in FIGS. 3, 6 and 9. The open position, with the piston rod 66 retracted, is shown in FIG. 5. It should be noted that the clamp bars 54 and 70 are positioned close underneath the table top 12. There is only sufficient clearance therebetween for reliable operation and cleaning. About one-quarter inch is sufficient clearance.

Clamp arm 60 carries an ejector therein. Ejector arm 74 is pivoted on pivot pin 62, see FIGS. 3 and 4. The ejector arm 74 carries ejector bar 76 thereon. In the closed position, the ejector bar 76 lies close below clamp bar 70, see FIG. 3. Compression spring 78 is secured on clamp arm 60 and engages the back of ejector bar 76, see FIGS. 3 and 8. Ejector depressor 80, see FIG. 3, has a head which engages the end of ejector bar 76. The ejector depressor 80 has a threaded shank 82 which engages through the back of clamp arm 60, see FIGS. 3 and 4. The extended position of the head of the ejector depressor 80 can thus be adjusted. The preferred adjusted position is shown in FIG. 3 where the ejector bar 76 is depressed behind clamp edge 72 on the clamp arm 60, as in the closed position shown in FIG. 3.

Jaw removal bar 84 is mounted on jaw removal arm 86 shown in FIG. 1. The arm 86 is pivoted under the table and is actuated by cylinder 88 to swing the jaw removal bar 84 from the starting position shown in FIG. 1 and 5 in the upward and backward direction shown by the dotted line arrow in FIG. 6. The three cylinders in this apparatus are defined as fluid cylinders and are preferably air cylinders, as is conventional in meat processing facilities. In operation, each hog's head in a series is slashed diagonally behind the snout at an appropriate distance to permit the snout to hang down. The hog's head is brought from right to left along the table 22. The jaw removal bar 84 is under the lower jaw. The loosened snout 24 gravitationally falls through the snout slot 22 to the position shown in FIG. 5. The lump of cartilage 90 in the snout hangs below the clamping edges 56 and 72. The hog's head 18 is thus in position for actuation of the apparatus. All three of the cylinders may be actuated at the same time. The sizes of the cylinders and the pressurized fluid flow to the cylinders controls the relative actuation. First, clamp arm 60 swings to the clamped position from the position in FIG. 5 to the position in FIGS. 3 and 6. This clamps the snout 24 between the clamp edges 56 and 72, as seen in FIG. 6. This clamping action occurs before either of the other cylinders makes significant movement.

Figure 8:
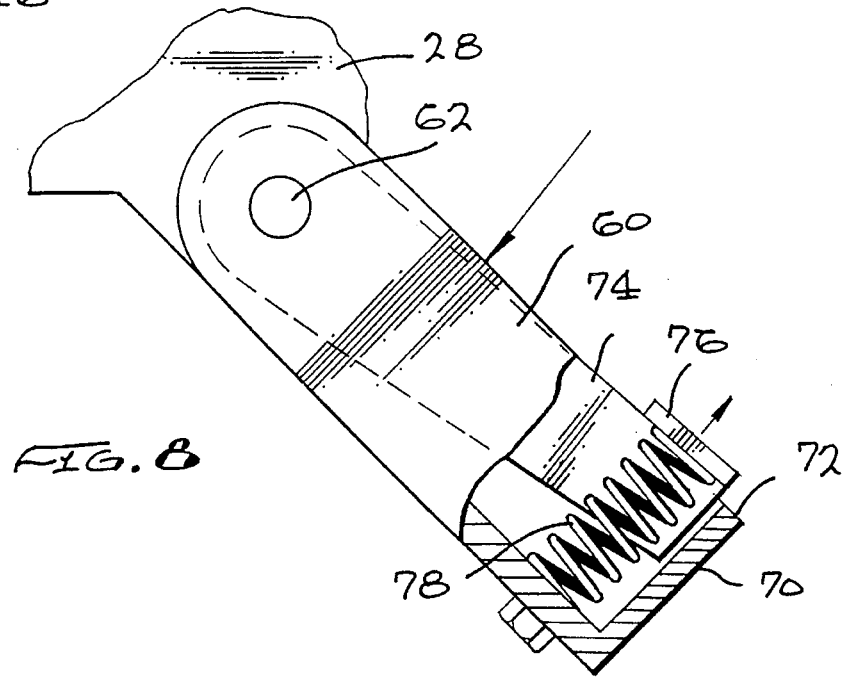
FIG. 8 is an enlarged view of the hog snout puller clamp arm with the ejector in the ejecting position.

In the next step of the sequence, both the cylinders 46 and 88 move their respective structure. The jaw removal bar 84 swings up and to the right, as shown in FIG. 6, removing the lower jaw. At the same time, swing arm 28 carrying the closed clamp arm 60 swings to the right from the position of FIG. 6 to the position of FIG. 7. Clamp arm 60 remains in the clamped position, as seen in full lines in FIG. 7, thus causing the snout 24 to be torn loose from the hog's head. When the swing arm 28 reaches its lower end position, shown in FIG. 7, the cylinder 64 is reversed to swing clamp arm 60 away from the swing arm 28, thus separating the clamp jaw edges 56 and 72. This releases the snout 24 from the clamp and permits spring 78 to expand, moving ejector bar 76 upward, as seen in FIG. 8, past the clamping edge 72 to eject the snout. The snout falls in a suitable location for further processing, such as on a conveyor belt.

As soon as the snout is pulled free and the lower jaw is broken away, the operator can pull the partly dismembered hog's head 18 out of the active position and deliver it to the next step in the process. At the same time, he actuates the cylinders to return the swing arm 28 to the ready position of FIG. 5. Of course, the clamp arm 60 is still in the open position from its release of the previous snout. At the same time the swing arm is returned to the position of FIG. 5, the cylinder 88 is reversed to bring the jaw removal bar 84 back to initial position for placement of the next hog's head. Suitable operator controls are provided to permit the operator to initiate the sequence of clamping, pulling, releasing and return. The sequence can be actuated by one or more controls such as one of the pushbutton controls 90 shown in FIG. 1. Instead of hand-operated controls, foot or knee-operated controls can be provided. In addition, there may be safety sensors which require the operator's hands be out of the way before actuation. However, in the present apparatus with the snout puller below the table top, operator injury hazard is substantially reduced.

By placement of the snout puller beneath the table top, much greater safety for the worker is achieved. In addition, by grasp of the snout, more reliable removal of the face plate is obtained. By pulling of the lower jaw at the same time, there is also greater productivity.

This invention has been described in its presently preferred best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An animal head processing apparatus comprising:

a table for receiving thereon a hog's head in the inverted position, a slot in said table for receiving the partially separated snout of the hog's head;

a snout puller beneath said table top and substantially below said slot, means on said snout puller for grasping the snout extending down through said slot for pulling the snout to pull the snout and adjacent tissue from the hog's head.

2. The apparatus of claim 1 wherein said snout puller comprises a swing arm pivoted below said table top.

3. The apparatus of claim 2 wherein said snout puller includes a clamp arm movably mounted on said swing arm to grasp the snout between said clamp arm and said swing arm so that rotation of said swing arm pulls the snout.

4. The apparatus of claim 3 wherein said clamp arm is pivoted on said swing arm so that the snout is clamped as said swing arm moves under said table top to pull the snout to a position away from said snout slot.

5. The apparatus of claim 3 wherein both said swing arm and said clamp arm have clamp edges thereon, said clamp edges being movable to a position adjacent each other for clamping the snout therebetween.

6. The apparatus of claim 5 wherein a fluid cylinder moves said clamp arm to its clamping position.

7. The apparatus of claim 6 wherein there is a fluid cylinder connected to said swing arm to swing said swing arm from its position below said table slot to a position away from said table slot.

8. The apparatus of claim 1 wherein said snout puller comprises a swing arm and a clamp arm, each said swing arm and said clamp arm having a clamp edge thereon, said clamp arm being movable with respect to said swing arm to move said clamp edges adjacent each other to clamp a hog snout thereon, said swing arm being movable away from said slot to pull the snout.

9. The apparatus of claim 8 wherein there is an ejector mounted with respect to one of said clamp edges, said ejector being movable with respect to its said clamp edge to eject a pulled snout after said snout puller pulls the snout.

10. The apparatus of claim 9 wherein said ejector is spring-mounted on said clamp arm and is resiliently mounted to push a snout away from said clamp edge on said clamp arm.

11. The apparatus of claim 10 wherein there is an ejector depressor mounted to depress said ejector away from said clamp edge when said clamp edges are adjacent each other in snout-clamping position.

12. The apparatus of claim 11 wherein said snout puller comprises a swing arm and a clamp arm, said ejector being resiliently mounted on said clamp arm and said ejector compressor being mounted on said swing arm.

13. The apparatus of claim 12 wherein said swing arm is pivotally mounted with respect to said table top and said clamp arm is pivotally mounted with respect to said swing arm.

14. An animal head processing apparatus comprising:
a table having a table top, said table top being for carrying thereon a hog's head in the inverted position with a partially severed snout, a slot in said table top for gravitationally receiving the partially severed snout;
a snout puller positioned below said table top, said snout puller comprising first and second clamp edges movable with respect to each other for clamping a snout therebetween and means for moving said snout puller to pull the snout and associated tissue away from the hog's head.

15. The apparatus of claim 14 wherein said snout puller comprises a swing arm movably mounted with respect to said table top and a clamp arm movably mounted with respect to said swing arm, said clamp edges being mounted on said swing arm and said clamp arm.

16. The apparatus of claim 15 further including stop means for preventing said clamp edges from engaging together so as to prevent the hog snout from being severed at said clamp edges.

17. The apparatus of claim 16 wherein said swing arm is movably mounted with respect to said table top by means of a fluid cylinder and said clamp arm is movable with respect to said swing arm by means of a fluid cylinder.

18. The apparatus of claim 17 wherein said fluid cylinder moving said clamp arm serves as said stop means to prevent said clamp edges from engaging each other.

19. The apparatus of claim 18 wherein said clamp arm is pivotally mounted on said swing arm and said swing arm is pivotally mounted with respect to said table top.

20. The apparatus of claim 16 further including a jaw removal bar movably mounted with respect to said table top, said jaw removal bar being positioned for removal of the lower jaw of a hog's head positioned with its snout through said slot in said table top.

21. The apparatus of claim 14 further including a jaw removal bar movably mounted with respect to said table top, said jaw removal bar being positioned for removal of the lower jaw of a hog's head positioned with its snout through said slot in said table top.

22. The apparatus of claim 19 further including a jaw removal bar movably mounted with respect to said table top, said jaw removal bar being positioned for removal of the lower jaw of a hog's head positioned with its snout through said slot in said table top.

23. The apparatus of claim 14 wherein there is an ejector mounted with respect to said clamp edges so that, when the snout is pulled free and said clamp edges are moved away from each other to discharge the removed snout, said ejector ejects the snout from said clamp edge.

24. The apparatus of claim 23 wherein said snout puller comprises a swing arm pivotally mounted with respect to said table top and a clamp arm pivotally mounted with respect to said swing arm, said ejector being mounted on said swing arm adjacent said clamp edge thereon.

25. The apparatus of claim 24 wherein there is an ejector depressor mounted on said swing arm for depressing said ejector when said clamp edges are adjacent to each other in clamping position.

26. An animal head processing apparatus comprising:
a table having a top, said table top having a slot therein, said table top being for receiving a hog's head in the inverted position with the hog's head having its snout partially severed so that the partially severed snout extends down through said slot in said table top;
a snout puller beneath said table top, said snout puller comprising first and second arms movable with respect to each other, said first and second arms each having a clamp thereon, said arms being movable with respect to each other so that said clamps move closely adjacent each other for clamping a hog snout therebetween but being limited from direct clamp contact with each other to prevent cutting off of the snout, said snout puller being movable from a first position wherein it can engage a snout extending through said slot to a second position wherein said arms can move apart to discharge the snout.

27. The apparatus of claim 26 further including a jaw removal bar movably mounted with respect to said table top, said jaw removal bar being positioned to engage the lower jaw of a hog's head when the snout is depending through said table top slot, said jaw removal bar being movable during snout removal to remove the snout and the lower jaw at the same time.

28. The apparatus of claim 26 wherein there is a snout ejector mounted on one of said arms to eject the snout at the second position when the arms move away from each other away from clamped position.

\* \* \* \* \*